United States Patent [19]

Eggert

[11] Patent Number: 4,693,144
[45] Date of Patent: Sep. 15, 1987

[54] CONTROL VALVE SYSTEM FOR A CONTINUOUSLY VARIABLE BELT DRIVE

[75] Inventor: Ulrich Eggert, Koeln, Fed. Rep. of Germany

[73] Assignee: Ford Motor Company, Dearborn, Mich.

[21] Appl. No.: 904,826

[22] Filed: Sep. 8, 1986

Related U.S. Application Data

[63] Continuation-in-part of Ser. No. 641,236, Aug. 16, 1984, abandoned.

[30] Foreign Application Priority Data

Sep. 14, 1983 [DE] Fed. Rep. of Germany ....... 3333136

[51] Int. Cl.$^4$ ............................................. B60K 41/16
[52] U.S. Cl. ........................................ 74/868; 474/18
[58] Field of Search ................... 74/867, 868; 474/12, 474/18, 28

[56] References Cited

U.S. PATENT DOCUMENTS

| | | | |
|---|---|---|---|
| 3,200,666 | 8/1965 | Schrodt et al. | 474/18 X |
| 4,258,591 | 3/1981 | Eckert et al. | 74/867 X |
| 4,400,164 | 8/1983 | Cadee | 474/12 |
| 4,462,275 | 7/1984 | Mohl et al. | 474/12 X |
| 4,467,674 | 8/1984 | van Deursen et al. | 74/867 |
| 4,500,301 | 2/1985 | Cadee | 474/28 |

FOREIGN PATENT DOCUMENTS

| | | | |
|---|---|---|---|
| 8103554 | 2/1983 | Netherlands | 474/18 |
| 989227 | 4/1965 | United Kingdom | 474/18 |
| 2058256 | 4/1981 | United Kingdom | 474/18 |

Primary Examiner—Lawrence Staab
Assistant Examiner—Dwight G. Diehl
Attorney, Agent, or Firm—Donald J. Harrington; Keith L. Zerschling

[57] ABSTRACT

A control valve system for a continuously variable belt transmission for an internal combustion engine comprising a main control valve acted upon by a force related to the transmission ratio and the rotational speed of the primary shaft, a transmission ratio control valve acted upon by a force related to the desired calibrated rotational speed of the engine and of the primary shaft, and an auxiliary valve connected mechanically to the transmission ratio control valve, the auxiliary valve (15) being acted upon by means of an electromagnetic pressure regulator (21) as a function of a selected characteristic relationship of desired rotational speeds for different operating conditions in an electronic control unit.

3 Claims, 6 Drawing Figures

CONTROL VALVE SYSTEM FOR A CONTINUOUSLY VARIABLE BELT DRIVE

This application is a continuation-in-part, of application Ser. No. 641,236, filed Aug. 16, 1984 now abandoned.

BACKGROUND OF THE INVENTION

My invention relates to improvements in a control system such as that shown in European Patent Application No. 0027672 published Apr. 29, 1981, by Van Doorne's Transmissie B.V. My invention may be applied also to the control system shown in U.S. Pat. No. 4,152,947, which is assigned to Van Doorne's Transmissie B.V.

In a control system of known design, examples of which are shown in the two references identified in the preceding paragraph, adjustable cone sheaves are used to obtain an infinite variation in torque ratio wherein cone pulleys mounted on a primary shaft are displaceable by means of a primary pressure servo and wherein companion cone pulleys are mounted on a secondary shaft and are axially displaceable by means of a secondary pressure servo thus effecting an infinite variation in torque ratio.

The control system for actuating the servos includes a pressure pump, a main control valve and a transmission ratio control valve. The main control valve consists of a valve element disposed in a valve bore which is acted upon at one end by a spring force that varies in magnitude depending upon the engine throttle position. That force is opposed by a governor pressure force that is dependent upon the speed of the primary shaft. An increased throttle setting tends to move the control valve for the secondary servo toward an overdrive position. That causes the pressure on the secondary servo to decrease. This occurs as the primary servo pressure is increasing.

The force on the control valve that establishes the primary servo pressure is altered by a brake valve when the vehicle is in condition for low speed operation under coast conditions thereby allowing hill braking at low engine speeds.

BRIEF DESCRIPTION OF THE INVENTION

According to a principal feature of my invention, it is possible to modify the relationship between engine throttle position and the effective pressure made available to the primary servo as well as to the secondary servo depending upon whether the vehicle operator desires a maximum fuel economy relationship between engine speed and vehicle speed or whether he desires a maximum performance relationship. In each instance the transmission system operates to achieve a low speed ratio condition at low throttle settings by utilizing a valve structure that, as in prior art control systems, is used to effect maximum engine braking during coasting.

A disadvantage of prior art control systems of this kind is that the desired calibrated speed for any given throttle setting is set by means of a cam disc which is rotated through an angle that is a function of the opening of the throttle valve of the engine. When the vehicle is traveling under torque, the cam disc fulfills its intended function; and during coasting the so-called brake valve modifies the effect of the cam disc to achieve the necessary engine coast braking especially at low speeds. It is necessary in that arrangement to equip a motor vehicle with various cam contours and calibrations that match the characteristics of the particular combustion engine that is used.

It is the object of this invention to improve the control valve system of the kind described above wherein it is possible to use a simpler and more versatile valve system that can be used with different internal combustion engines and vehicle designs without the necessity for providing special cam discs and special calibrations of the ratio control valves. According to the improvements of my invention, the calibrated cams are not required; and the auxiliary valve, unlike the brake valve of conventional control systems, is actuated by a controlled pressure delivered to it from an electronic control unit that has stored engine characteristics and that is capable of delivering an electronic control signal to a pressure regulator that develops the pressure made available to the auxiliary valve, the latter being mechanically connected to the ratio control valve. The signal that is made available to the electronic contrl unit is a signal that corresponds to the movement of the engine throttle.

The electronic control unit stores the characteristics for any particular engine for both optimum fuel economy operation and optimum performance operation. The signal delivered to the auxiliary valve can be chosen by the vehicle operator. Regardless of whether an economy range or a performance range is chosen, the control system will develop an optimum vehicle speed versus engine speed characteristic with a capability for downshifting at low throttle settings to effect engine braking in the lowest speed ratio while the vehicle is traveling at a low velocity.

PARTICULAR DESCRIPTION OF THE INVENTION

The invention will be described particularly with reference to the ratio control valve and the auxiliary valve. For a background description of a control system that is capable of embodying these valves, reference may be made to previously described European patent publication No. 0027672.

Figure 1:
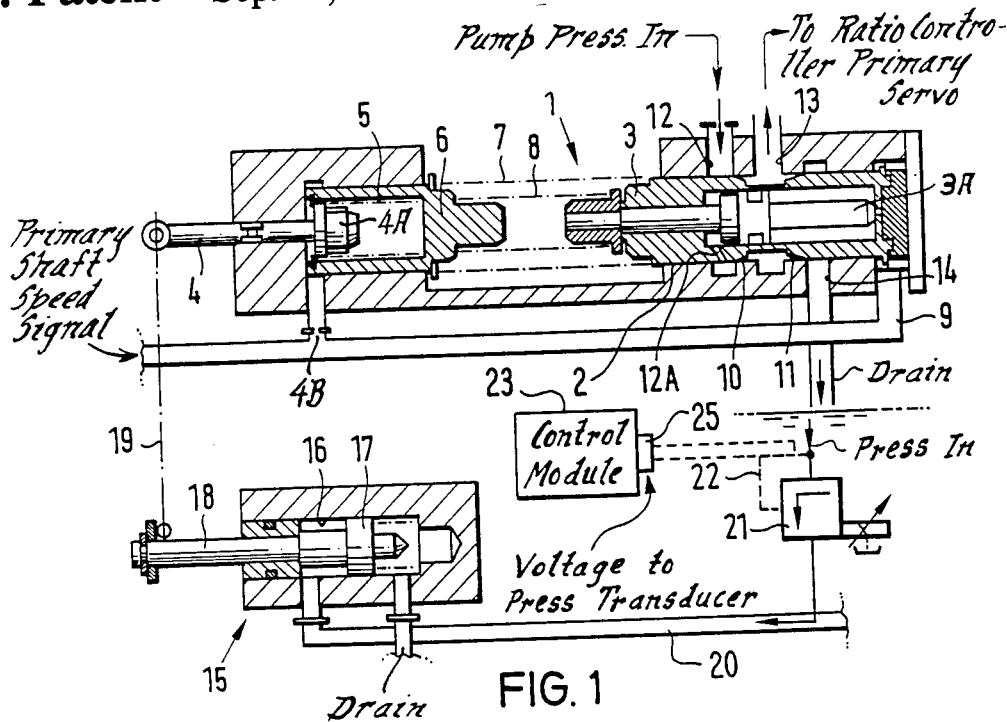
FIG. 1 shows a portion of the control valve system of which the transmission ratio control valve and the auxiliary valve form a part.

In FIG. 1 a transmission ratio control valve 1 comprises a valve spool element 3 disposed in a valve bore 2. Element 3 is acted upon by springs 7 and 8 which are seated on piston 6. Internal spring 5 acts on the piston 6 and urges it in a right hand direction. A mechanical rod system 4 applies a force to the spring 5 which is transmitted through the springs 7 and 8 to the valve element 3. The opposite end of the valve element 3 is acted upon by a governor pressure that is proportional to the speed of rotation of the primary belt sheave drive shaft. That governor pressure is distributed to the right hand end of the valve 3 by passage 9. The force that is distributed through the mechanical rod system 4 is a function of the desired calibrated engine speed for any throttle setting.

The valve 3 comprises valve lands 10 and 11 which control the degree of communication between pump pressure inlet passage 12 and passage 13 which is in communication with the primary servo working pressure chamber for the primary sheaves that control the transmission ratio. The degree of communication depends upon the balance of forces acting on the valve 3; namely, the force of springs 7 and 8 and the governor pressure force developed by the governor pressure in passage 9. That pressure force is developed as shown in European patent specification No. 0027672 by a Pitot tube governor system. A drain passage 14 is located adjacent the primary servo pressure passage 13.

Valve element 3 is formed with an internal bore that receives an internal valve piston 3A which is acted upon at its left side by the pressure in the passage 12. Port 12A connects passage 12 to the left side of piston 3A. The right hand side of the internal piston 3A is acted upon by governor pressure in the passage 9.

As the primary valve element 3 moves to the left, as seen in FIG. 1, the primary clutch pressure in passage 13 increases because the degree of communication between passages 12 and 13 increases. This tends to move the primary belt sheave toward an overdrive position.

The control system is arranged so that upon movement of the primary belt sheave toward an overdrive position, valve structure, not shown, controlling the secondary sheave moves to decrease the secondary servo pressure. The secondary servo controls the belt tension since the diameter of the primary servo is greater than the diameter of the secondary servo. This change in the relative pressures of the primary servo and the secondary servo results in movement of the sheaves toward the overdrive condition. As the speed increases, the governor pressure will not increase beyond the point where the engine cannot overcome the increasing road load. At that point the transmission again is in equilibrium following the movement of the valve 3 in a leftward direction. The valve 3 thus acts as a flow regulator rather than as a pressure regulator.

Upon advancement of the engine throttle, the primary chamber of the primary servo is emptied and the secondary chamber of the secondary servo is filled. The capacity of the pump is sufficient to permit the filling of the secondary chamber at the right rate as fluid is exhausted from the primary chamber. If this change occurs upon an advancement of the engine throttle position suddenly rather than gradually, there will be no momentary reduced pressure in the secondary servo because there is no direct mechanical connection between the valve 3 and the linkage mechanism 4. Upon movement of the linkage mechanism 4 quickly to the right, plunger 4A is displaced against the opposing force of the spring 5. An orifice 4B delays the filling of the cavity behind the piston 6. This cushions the force transfer through the springs 7 and 8.

In order to achieve the sensation of increasing engine speed upon advancement in engine throttle, the piston 3A is shifted upon an increase in the secondary servo chamber pressure. That servo pressure acts on the left hand end of the piston 3A as explained previously thus shifting the piston 3A until the stop is reached as the secondary pressure decreases. Thus additional governor pressure is required to get a further increase in vehicle speed.

Auxiliary valve 15 comprises a valve body element 17 disposed in valve bore 16. Element 16 is connected to rod system 4 of the ratio control valve 1 by means of piston rod 18 and a mechanical connected 19. Control pressure which is produced by an electromagnetic pressure regulator 21 acts upon one side of the valve element 17. Pressure is distributed from the regulator 21 to the left hand side of the valve element 17 through passage 20. Electromagnetic pressure regulator 21 is controlled by an electronic control module 23 which contains the calibrated rotational speeds associated with different throttle settings for a particular engine. These characteristics are stored in the module. Control module 23 is connected to the regulator 21 through control line 22. The control module 23 includes a voltage to pressure transducer, the output of which is connected as shown in FIG. 1 to the pressure regulator 21.

Figure 2:
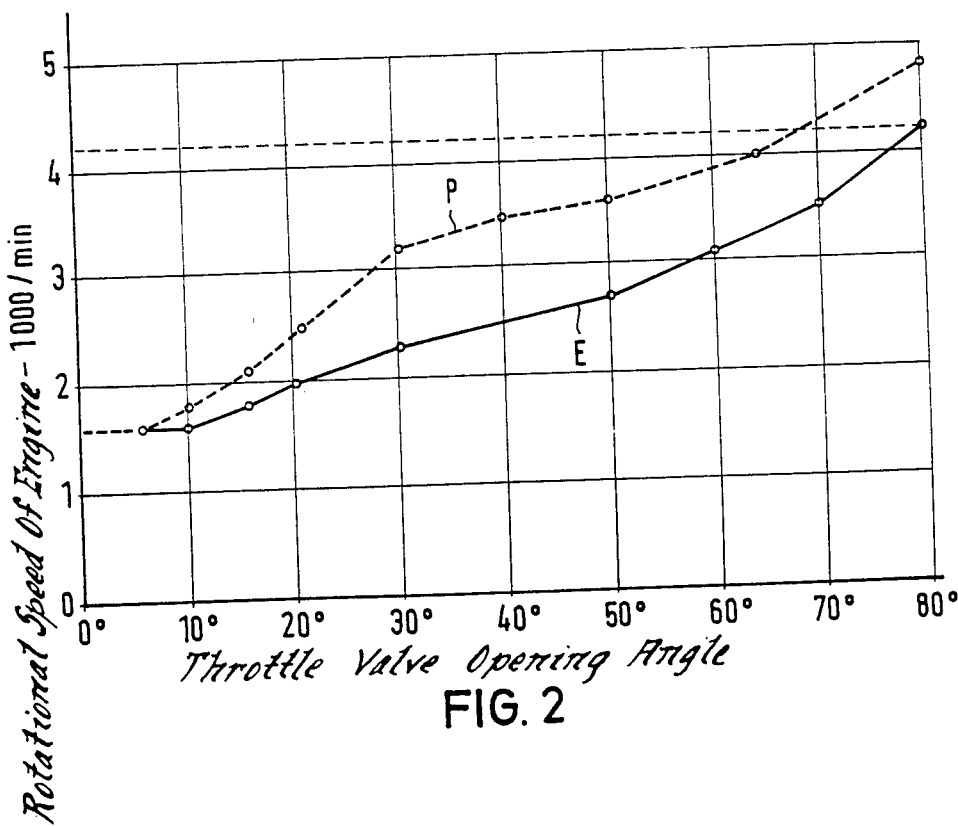
FIG. 2 is a diagram showing the engine speed versus the throttle valve opening relationship for a particular engine for both a performance operating mode and a maximum fuel economy operating mode.

In FIG. 2 there is illustrated for reference purposes a plot of the characteristics for a particular engine. It shows the rotational speed of the engine versus the throttle opening at each speed which will achieve either a high performance condition or an engine fuel economy operating condition, the latter being shown by the legent "E" and the former being shown by the legend "P".

Figure 3:
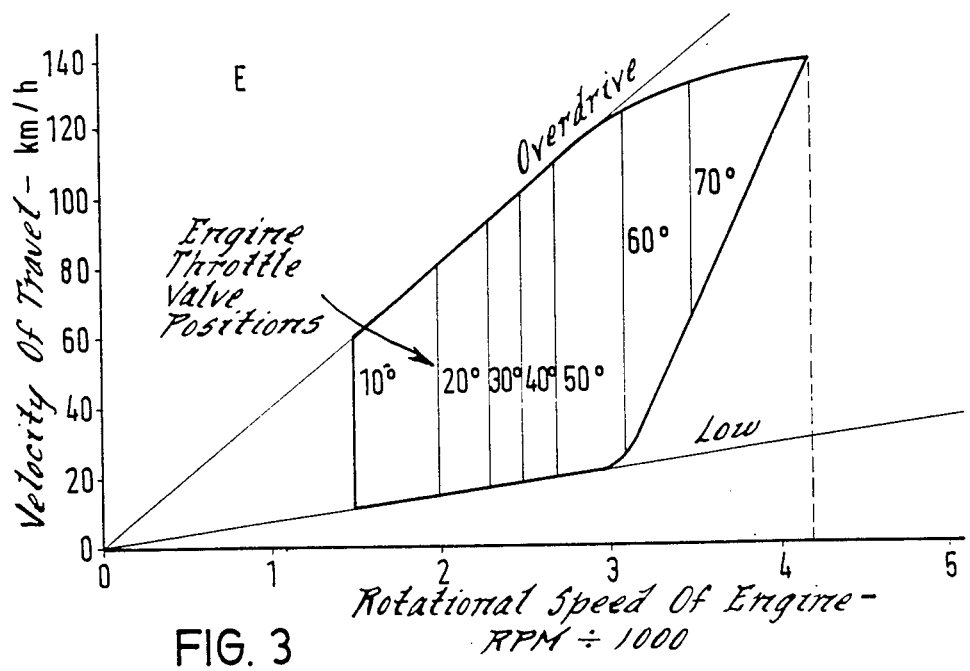
FIG. 3 is a diagram of the transmission ratio shift characteristics illustrated on a characteristic plot showing vehicle travel and rotational speed of the engine when the control system is conditioned for operation in the maximum fuel economy mode.
Figure 4:
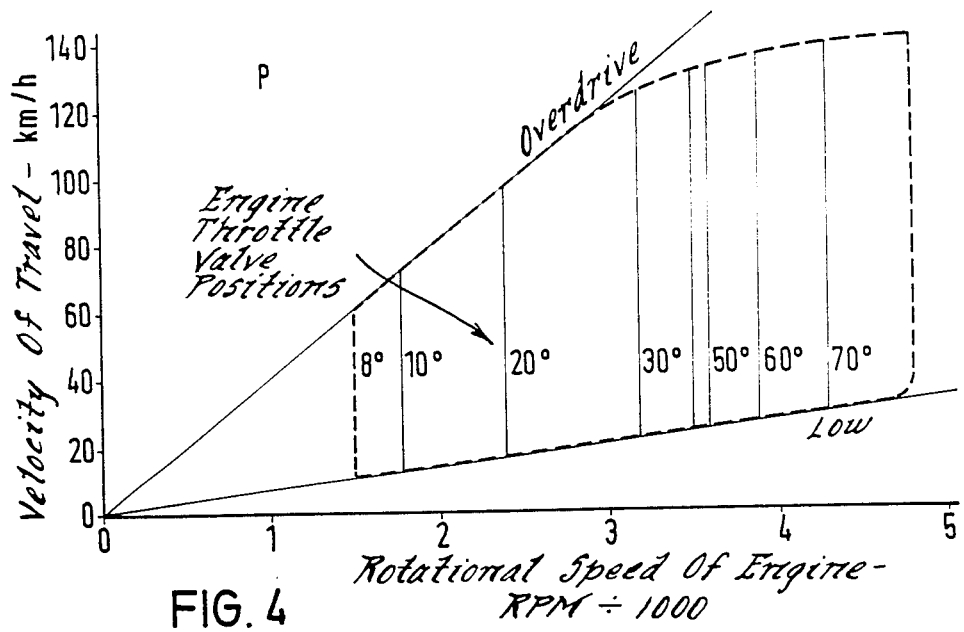
FIG. 4 is a diagram corresponding to FIG. 3 when the control system is in condition for operation in the performance mode.

FIGS. 3 and 4 show characteristics plots of the rotational speed of the engine versus velocity of travel which can be achieved using the control system of this invention. FIG. 3 shows the economy operating mode identified by the legeng "E" in FIG. 2, and FIG. 4 shows the performance operating mode identified by the legent "P" in FIG. 2. It can be seen from FIGS. 3 and 4 that a change in ratio from the low to the overdrive range can be achieved with a constant angle setting for the engine throttle as the velocity of travel increases. It also can be seen that at low throttle settings under coast conditions, for example, the transmission will change from the overdrive mode to the low speed mode for coasting operation. It can be seen also that for any given vehicle speed a relatively high setting of the engine throttle is required at a particular engine speed in comparison to the setting that would be required for that same speed if the transmission is in condition for performance operation. In FIG. 4, which shows the performance mode, a relatively high setting on the transmission ratio towards the overdrive takes place considerably later at higher rotational speeds of the engine. Although a better acceleration of the vehicle can be achieved in this way, the rate of fuel consumption is increased.

Figure 5:
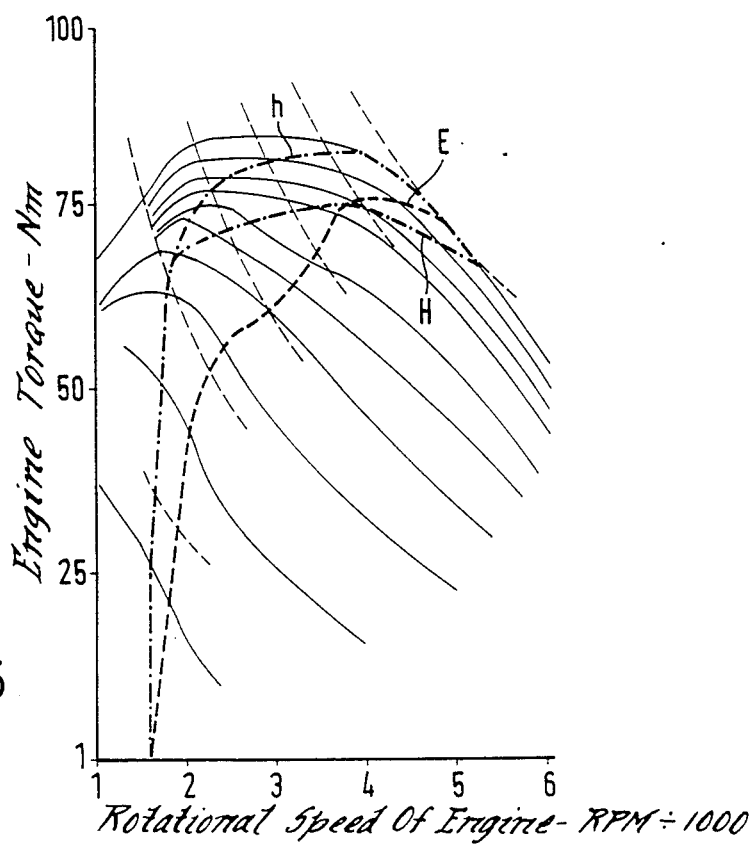
FIG. 5 is a torque versus speed diagram for an internal combustion engine with transmission ratio projections corresponding to different characteristic diagrams with respect to the optimum operating points for the engine for various throttle settings.

FIG. 5 shows the torque diagram for a 1.1 liter internal combustion engine in conjunction with a continuously variable transmission having the transmission ratio characteristic illustrated in FIG. 3. The operating characteristics of this engine transmission combination is shown by dotted lines in FIG. 3. For purposes of comparison the corresponding operating characteristics shown in dash-dot lines may be obtained with a conventional control system. The line "h" designates the characteristic curve of such a conventional control at low speeds. The line "H" is the corresponding curve for high speeds.

Figure 6:
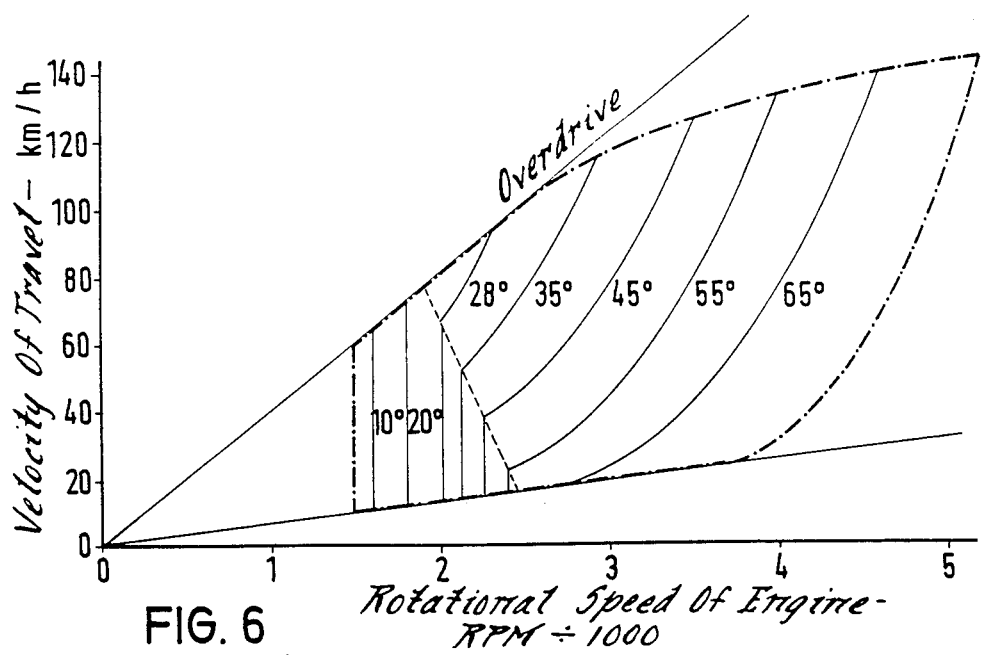
FIG. 6 is a transmission ratio characteristic diagram for an engine showing the relationship between the velocity of travel and the engine speed when the engine is used with a conventional infinitely variable transmission and control system.

FIG. 6 is used merely for purposes of comparison with FIGS. 3 and 4. FIG. 6 shows the ratio characteristic diagram of a conventional control system. The lines of constant throttle opening extend in a curved fashion in FIG. 6, rather than vertically as in FIGS. 3 and 4.

In order to make it possible for the electronic control unit to fetch a corresponding stored characteristic diagram desired by the operator which might be suitably associated with the various operating conditions, one sensor for the throttle valve position, one sensor for the rotational speed of the engine and one sensor for the selector lever position or for the program selection are provided. The sensor or switch for the selection of the program allows the operator to obtain performance corresponding to either FIG. 3 or FIG. 4 according to his preference.

Having thus described a preferred embodiment of my invention, what I claim and desire to secure by U.S. Letters Patent is:

1. In a control system for an infinitely variable belt drive transmission adapted to deliver torque to a driven member from an internal combustion engine with an operator controlled fuel supply;

a ratio control valve mechanism comprising a valve element, a valve bore slidably receiving said valve element, first fluid pressure passage means for distributing a driving speed pressure signal to one end of said valve element, a pressure inlet passage and a pressure outlet passage communicating with said valve bore, the outlet passage being adapted to communicate with a ratio control servo;

a force transmitting mechanism including a movable spring seat, valve springs between said spring seat and said valve element;

a secondary valve comprising a movable secondary valve element having a connection with said force transmitting mechanism, second fluid pressure passage means for distributing a pressure signal to said secondary valve element whereby the effective force acting on said ratio control mechanism can be controlled; and an electronic control module adapted to store multiple engine torque and speed relationships with respect to a range of engine fuel supply parameters, said module being connected to said secondary valve element through said second pressure distributing means whereby the operator may select the desired stored relationship to effect either optimum fuel economy or optimum performance.

2. The combination as set forth in claim 1 wherein said force transmitting mechanism comprises a valve spool in alignment with said ratio control valve element, said springs being located between said valve spool and said ratio control valve element, said force transmitting mechanism including further a valve plunger received within said valve spool, a valve spring in said valve spool resisting relative movement between said valve spool and said valve plunger, and a flow control orifice connecting one side of said valve spool with said distributing means for said driving speed pressure signal.

3. The combination as set forth in claim 1 wherein said force transmitting mechanism comprises a valve spool in alignment with said ratio control element, said springs being located between said valve spool and said ratio control valve element, and a fluid connection between said valve spool and said distributing means for said driving speed pressure signal whereby an increase in the driving speed causes an increase in the spring force of said springs on said ratio control valve element in opposition to the force on said ratio control valve element created by said speed pressure signal.

* * * * *